(12) United States Patent
Shiraishi

(10) Patent No.: US 9,208,415 B2
(45) Date of Patent: Dec. 8, 2015

(54) IMAGE PROCESSING APPARATUS AND METHOD ENCODING MULTI-VALUED IMAGE GENERATED WITH FEWER VALUES

(71) Applicant: Naoto Shiraishi, Kanagawa (JP)

(72) Inventor: Naoto Shiraishi, Kanagawa (JP)

(73) Assignee: RICOH COMPANY LIMITED, Tokyo (JP)

( * ) Notice: Subject to any disclaimer, the term of this patent is extended or adjusted under 35 U.S.C. 154(b) by 0 days.

(21) Appl. No.: 14/613,520

(22) Filed: Feb. 4, 2015

(65) Prior Publication Data

US 2015/0235113 A1 Aug. 20, 2015

(30) Foreign Application Priority Data

Feb. 17, 2014 (JP) ................................. 2014-027907

(51) Int. Cl.
*G06K 15/02* (2006.01)
*H04N 1/60* (2006.01)

(52) U.S. Cl.
CPC ........ *G06K 15/1878* (2013.01); *G06K 15/1807* (2013.01); *H04N 1/6027* (2013.01); *G06K 2215/0094* (2013.01)

(58) Field of Classification Search
None
See application file for complete search history.

(56) References Cited

U.S. PATENT DOCUMENTS

| | | | |
|---|---|---|---|
| 5,337,168 A | 8/1994 | Fujii et al. | |
| 5,341,468 A | 8/1994 | Shiraishi et al. | |
| 5,396,585 A | 3/1995 | Fujii et al. | |
| 5,448,690 A | 9/1995 | Shiraishi et al. | |
| 5,455,900 A | 10/1995 | Shiraishi et al. | |
| 5,459,822 A | 10/1995 | Izawa et al. | |
| 5,465,371 A | 11/1995 | Fujii et al. | |
| 5,502,802 A | 3/1996 | Shiraishi | |
| 5,551,019 A | 8/1996 | Izawa et al. | |
| 5,732,204 A | 3/1998 | Fukushima et al. | |

(Continued)

FOREIGN PATENT DOCUMENTS

| | | |
|---|---|---|
| JP | 2002-225381 | 8/2002 |
| JP | 2009-124614 | 6/2009 |

(Continued)

OTHER PUBLICATIONS

U.S. Appl. No. 07/727,832, filed Jul. 9, 1991.

(Continued)

*Primary Examiner* — Scott A Rogers
(74) *Attorney, Agent, or Firm* — Harness, Dickey & Pierce, P.L.C.

(57) ABSTRACT

An image processing apparatus includes a determining unit that determines whether image data includes multi-valued drawing information for drawing a multi-valued image; a multi-valued drawing unit that draws the multi-valued image of the image data when the multi-valued drawing information is determined to be included in the image data; a less-than-multi-valued drawing unit that draws a less-than-multi-valued image of the image data when the multi-valued drawing information is not determined to be included in the image data; a value-count reducing image processing unit that reduces number of values of a drawing result of the multi-valued image to generate an image with a fewer number of values; and a less-than-multi-valued encoding processing unit that encodes a drawing result obtained by drawing the less-than-multi-valued image and encodes the generated image with the fewer number of values.

8 Claims, 7 Drawing Sheets

(56) References Cited

U.S. PATENT DOCUMENTS

| | | |
|---|---|---|
| 5,739,826 A | 4/1998 | Shiraishi et al. |
| 5,828,378 A | 10/1998 | Shiraishi |
| 5,903,276 A | 5/1999 | Shiraishi |
| 6,081,274 A | 6/2000 | Shiraishi |
| 6,172,678 B1 | 1/2001 | Shiraishi |
| 7,009,622 B2 | 3/2006 | Shiraishi |
| 8,670,156 B2 | 3/2014 | Shiraishi |
| 2003/0063813 A1 | 4/2003 | Shiraishi |
| 2005/0062994 A1 | 3/2005 | Shiraishi |
| 2005/0200910 A1 | 9/2005 | Kanoshima et al. |
| 2005/0207667 A1 | 9/2005 | Shiraishi |
| 2005/0246684 A1 | 11/2005 | Shiraishi |
| 2006/0072142 A1 | 4/2006 | Shiraishi |
| 2009/0051942 A1 | 2/2009 | Kanoshima et al. |
| 2009/0128857 A1 | 5/2009 | Shiraishi |
| 2010/0238467 A1 | 9/2010 | Shiraishi |
| 2011/0033125 A1 | 2/2011 | Shiraishi |
| 2011/0063143 A1 | 3/2011 | Shiraishi |
| 2011/0231629 A1 | 9/2011 | Shiraishi |
| 2011/0273736 A1 | 11/2011 | Shiraishi |
| 2013/0094037 A1 | 4/2013 | Shiraishi |
| 2014/0226186 A1* | 8/2014 | Shiraishi ............... 358/2.1 |
| 2014/0233067 A1 | 8/2014 | Shiraishi |
| 2014/0362395 A1 | 12/2014 | Shiraishi |

FOREIGN PATENT DOCUMENTS

| | | |
|---|---|---|
| JP | 2009-269341 | 11/2009 |
| JP | 4490783 | 4/2010 |
| JP | 2011-025539 | 2/2011 |

OTHER PUBLICATIONS

U.S. Appl. No. 07/932,357, filed Aug. 19, 1992.
U.S. Appl. No. 07/827,635, filed Jan. 29, 1992.
U.S. Appl. No. 08/076,989, filed Jun. 15, 1993.
U.S. Appl. No. 08/597,344, filed Feb. 6, 1996.
U.S. Appl. No. 08/102,050, filed Aug. 4, 1993.
U.S. Appl. No. 08/317,116, filed Oct. 3, 1994.
U.S. Appl. No. 08/381,102, filed Jan. 31, 1995.

* cited by examiner

BAND IMAGE #1 (LESS-THAN-MULTI-VALUED DRAWING)

BAND IMAGE #2 (MULTI-VALUED DRAWING)

BAND IMAGE #3 (LESS-THAN-MULTI-VALUED DRAWING)

BAND IMAGE #4 (LESS-THAN-MULTI-VALUED DRAWING)

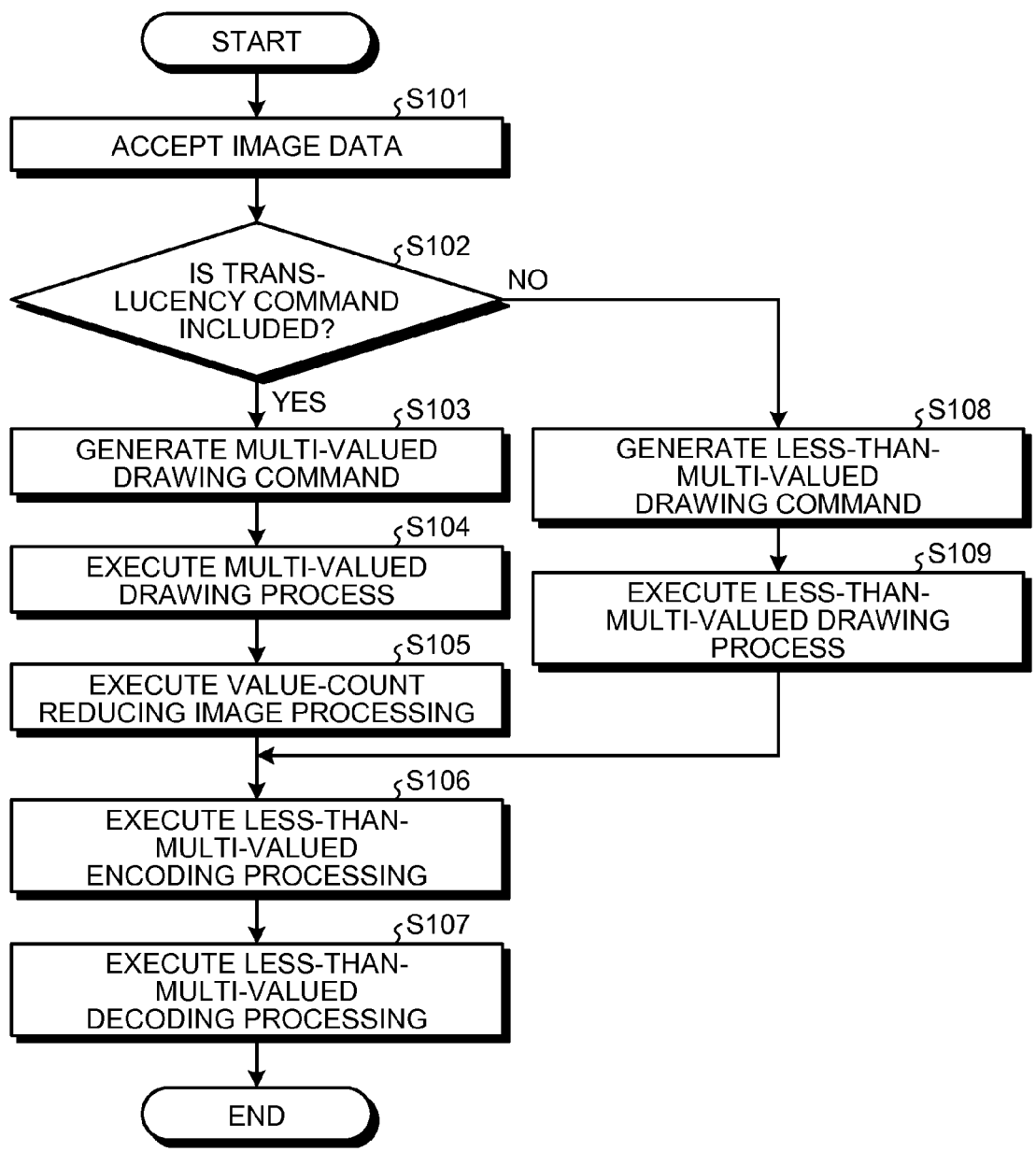

IMAGE PROCESSING APPARATUS AND METHOD ENCODING MULTI-VALUED IMAGE GENERATED WITH FEWER VALUES

CROSS-REFERENCE TO RELATED APPLICATIONS

The present application claims priority to and incorporates by reference the entire contents of Japanese Patent Application No. 2014-027907 filed in Japan on Feb. 17, 2014.

BACKGROUND OF THE INVENTION

1. Field of the Invention

The present invention relates to an image processing apparatus, an image processing method, and an image forming apparatus.

2. Description of the Related Art

Printer devices that perform printing page by page have so far been known. Such printer devices are sometimes called "page printers". For example, a color printer as one of such page printers analyzes a page description language (PDL), draws a multi-valued band image, performs processes of color conversion, gradation, and encoding, decodes the codes after being accumulated for one page, and prints the processed image. Although such page printers are required, for example, to have a high resolution in printing and a high print speed, the performance of a central processing unit (CPU) has become difficult to fulfill these requirements.

Hence, technologies are nowadays available that implement some of processes performed by the CPU with hardware. For example, image processing, such as translucency processing including translucent drawing, can be implemented with hardware. In the translucency processing, correct colors of a background that is a gradation-processed image are difficult to be identified, so that the translucency processing is difficult to be applied to the image drawn by less-than-multi-valued drawing. Consequently, if translucent drawing is included, hardware for multi-valued drawing is used, and if translucent drawing is not included, hardware for less-than-multi-valued drawing is used.

Conventional technologies are described, for example, in Japanese Patent Application Laid-open No. 2011-25539, Japanese Patent Application Laid-open No. 2009-269341, and Japanese Patent No. 4490783.

The conventional technology described above, however, has a problem of increasing the scale of the configuration of the hardware used for the image processing. Specifically, the conventional technology increases the scale of the configuration of the hardware used for the image processing because of using the hardware for multi-valued drawing and the hardware for less-than-multi-valued drawing.

Therefore, there is a need for an image processing apparatus, an image processing method, and an image forming apparatus that can simplify the configuration of the hardware used for the image processing.

SUMMARY OF THE INVENTION

It is an object of the present invention to at least partially solve the problems in the conventional technology.

There is provided an image processing apparatus that includes a determining unit that determines whether image data includes multi-valued drawing information for drawing a multi-valued image; a multi-valued drawing unit that draws the multi-valued image of the image data when the multi-valued drawing information is determined to be included in the image data; a less-than-multi-valued drawing unit that draws a less-than-multi-valued image of the image data when the multi-valued drawing information is not determined to be included in the image data; a value-count reducing image processing unit that reduces number of values of a drawing result of the multi-valued image to generate an image with a fewer number of values; and a less-than-multi-valued encoding processing unit that encodes a drawing result obtained by drawing the less-than-multi-valued image and encodes the generated image with the fewer number of values.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 9 is a flowchart illustrating the overall processing flow according to the first embodiment.

DETAILED DESCRIPTION OF THE PREFERRED EMBODIMENTS

Embodiments of an image processing apparatus, an image processing method, and an image forming apparatus according to the present invention will be described below in detail with reference to the accompanying drawings. The embodiments described below are not intended to limit the present invention.

First Embodiment

Apparatus Configuration

Figure 1:
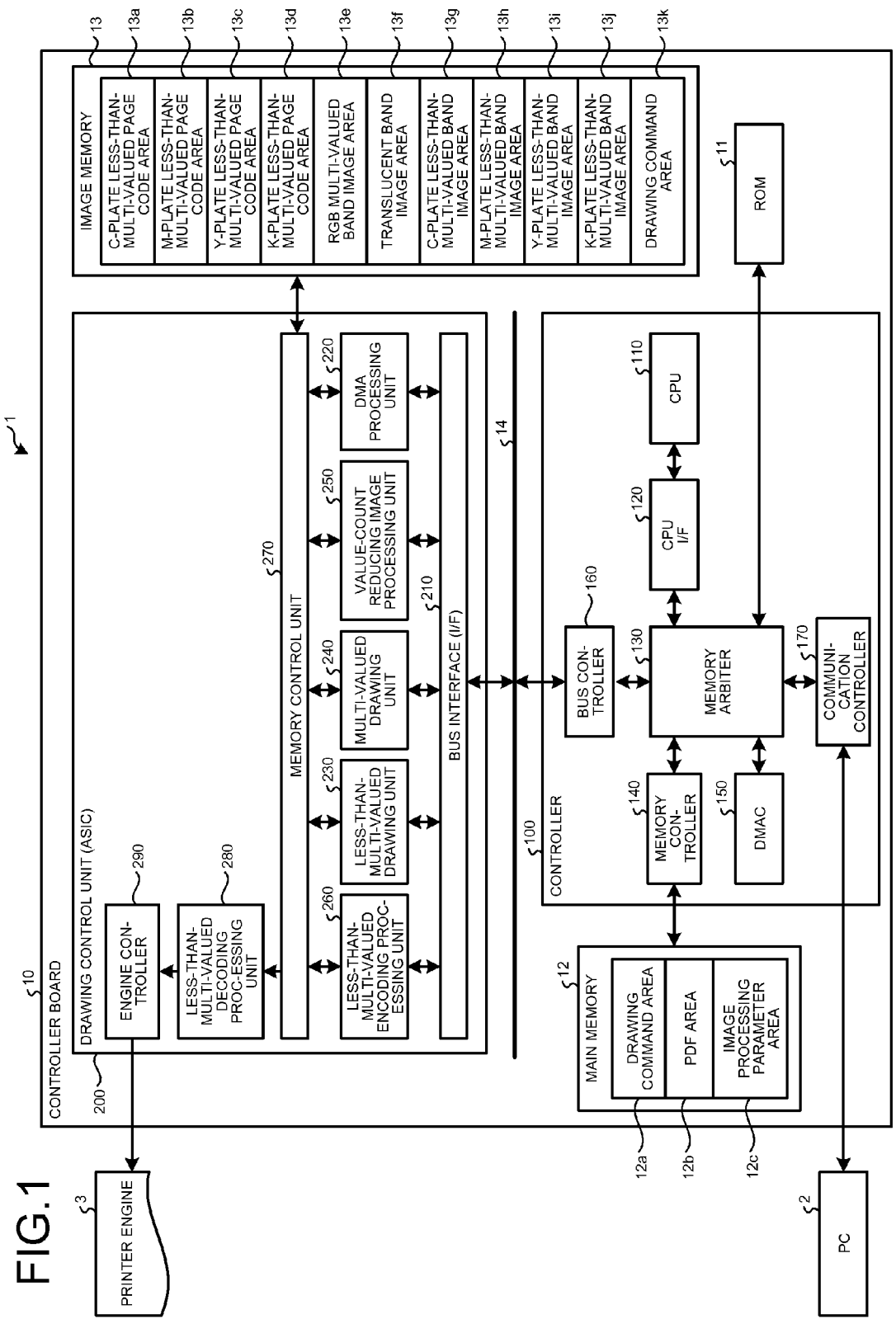
FIG. 1 is a diagram illustrating a configuration example of an image forming apparatus according to a first embodiment of the present invention.

The configuration of an image forming apparatus according to a first embodiment of the present invention will be described using FIG. 1. FIG. 1 is a diagram illustrating an example of the configuration of the image forming apparatus according to the first embodiment.

As illustrated in FIG. 1, this image forming apparatus 1 includes a controller board 10 and a printer engine 3. Of these components, the controller board 10 includes a read-only memory (ROM) 11, a main memory 12, an image memory 13, a controller 100, and a drawing control unit 200. For example, the controller board 10 is a printer controller board, and is provided on one substrate. The controller board 10 is an example of an "image processing apparatus".

The drawing control unit 200 is an application-specific integrated circuit (ASIC) that implements some of processes performed by a conventional CPU with hardware. The controller 100 is connected to the drawing control unit 200 via a bus 14. A personal computer (PC) 2 generates data written in a page description language (PDL) according to a user operation. For example, the PC 2 generates image data such as Portable Document Format (PDF) data, and sends it to the image forming apparatus 1.

The controller 100 includes a CPU 110, a CPU interface 120, a memory arbiter 130, a memory controller 140, a direct memory access controller (DMAC) 150, a bus controller 160, and a communication controller 170. The controller 100 is connected to the ROM 11 and the main memory 12. The ROM 11 stores therein, for example, various computer programs for controlling the controller board 10 and font information of characters. The main memory 12 includes a plurality of predetermined areas, such as a drawing command area 12a, a PDF area 12b, and an image processing parameter area 12c. For example, the drawing command area 12a stores therein drawing commands; the PDF area 12b stores therein the PDF data; and the image processing parameter area 12c stores therein parameters for use in image processing.

The CPU 110 controls the overall operation of the controller board 10 according to computer programs stored, for example, in the ROM 11. The CPU 110 also stores the PDF data sent by the PC 2 in the PDF area 12b. The CPU 110 then analyzes the PDF data stored in the PDF area 12b, and determines which of multi-valued drawing and less-than-multi-valued drawing is to be performed. For example, the CPU 110 determines which of the multi-valued drawing and the less-than-multi-valued drawing is to be performed based on the determination of whether the PDF data includes a translucency command corresponding to translucency processing. Whether a translucency command is included is determined on a page-by-page basis or a band-image by band-image basis of the PDF data. The band image is a divided portion of one page of the image data. The translucency command is an example of multi-valued drawing information. The CPU 110 is an example of a "determining unit".

In the present embodiment, the multi-valued drawing refers to a drawing method of directly drawing an image on an RGBA-pixel by RGBA-pixel basis or a CMYK-pixel by CMYK-pixel basis before gradation processing. The symbol "A" of RGBA represents an attribute. Each of R, G, B, and A contains 8 bits, and RGBA contains 32 bits in total. Each of C, M, Y, and K contains 8 bits, and CMYK contains 32 bits in total. A multi-valued image refers to an image drawn by the multi-valued drawing.

The less-than-multi-valued drawing refers to a drawing method of directly drawing images of a C plate, an M plate, a Y plate, and a K plate after the gradation processing on 1 bit or 2 bits, for example. A less-than-multi-valued image refers to an image obtained by color-converting an RGB multi-valued image into a CMYK multi-valued image, then gradation-processing the CMYK multi-valued image, and converting the result into an image of fewer bits, such as 1 bit or 2 bits. Each color component of R, G, and B contains 8 bits, and an RGB color contains 24 bits in total. Each color component of C, M, Y, and K contains 8 bits, and a CMYK color contains 32 bits in total. The less-than-multi-valued image is printed on a paper or the like for each of the C, M, Y, and K plates, and hence is often a plane image.

Figure 2:
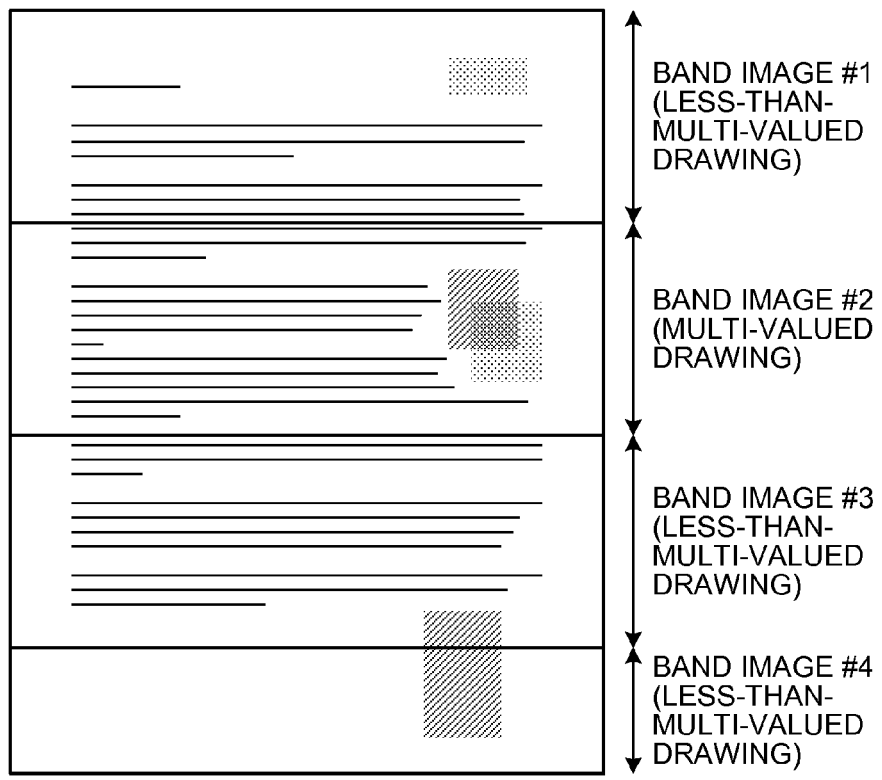
FIG. 2 is a diagram explaining an example of switching drawing on a band-image by band-image basis.

FIG. 2 is a diagram explaining an example of switching the drawing on a band-image by band-image basis. As illustrated in FIG. 2, a band image #1 does not include translucent drawing, so that the CPU 110 determines to perform the less-than-multi-valued drawing; a band image #2 includes the translucent drawing, so that the CPU 110 determines to perform the multi-valued drawing; a band image #3 does not include the translucent drawing, so that the CPU 110 determines to perform the less-than-multi-valued drawing; and a band image #4 does not include the translucent drawing, so that the CPU 110 determines to perform the less-than-multi-valued drawing.

In other words, the CPU 110 determines to perform the multi-valued drawing if the translucency command is included, and determines to perform the less-than-multi-valued drawing if the translucency command is not included. Based on the above-described analysis, the CPU 110 generates drawing commands for the less-than-multi-valued drawing and the multi-valued drawing, and stores the generated drawing commands in the drawing command area 12a. The drawing commands stored in the drawing command area 12a are transferred to the image memory 13.

The CPU interface 120 is an interface to the CPU 110. The CPU 110 is connected to various memories and various controllers via the CPU interface 120 and the memory arbiter 130. The memory arbiter 130 performs arbitration between the main memory 12 and the various controllers. The memory controller 140 follows commands from, for example, the CPU 110 to control access to the main memory 12.

The DMAC 150 follows commands from, for example, the CPU 110 to control access to the main memory 12 and access, via the bus 14, to the drawing control unit 200. The bus controller 160 controls access to the bus 14. The communication controller 170 controls communication with external devices. In the example illustrated in FIG. 1, the communication controller 170 controls the communication with the external devices, such as the PC 2. The PDF data sent by the PC 2 is stored in the PDF area 12b included in the main memory 12 via the communication controller 170, the memory arbiter 130, and the memory controller 140.

The image memory 13 stores therein less-than-multi-valued band codes of cyan, magenta, yellow, and black (CMYK), multi-valued band images of red, green, and blue (RGB), translucent multi-valued band images, CMYK less-than-multi-valued band images, and the drawing commands. Specifically, the image memory 13 includes a less-than-multi-valued page code area, a multi-valued band image area, a less-than-multi-valued band image area, and a drawing command area. The less-than-multi-valued page code area corresponds to a C-plate less-than-multi-valued page code area 13a, an M-plate less-than-multi-valued page code area 13b, a Y-plate less-than-multi-valued page code area 13c, and a K-plate less-than-multi-valued page code area 13d. The multi-valued band image area corresponds to an RGB multi-valued band image area 13e and a translucent band image area 13f. The less-than-multi-valued band image area corresponds to a C-plate less-than-multi-valued band image area 13g, an M-plate less-than-multi-valued band image area 13h, a Y-plate less-than-multi-valued band image area 13i, and a K-plate less-than-multi-valued band image area 13j. The drawing command area corresponds to a drawing command area 13k.

Figure 3:
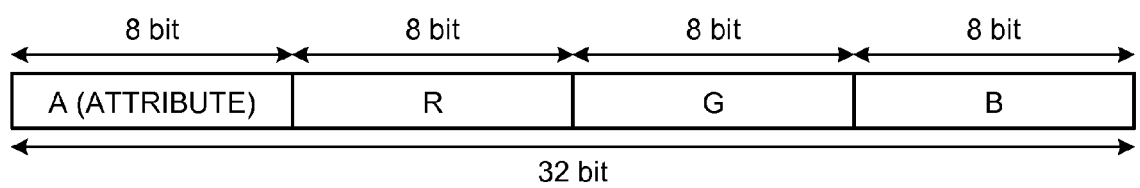
FIG. 3 is a diagram illustrating a format example of a red-green-blue (RGB) multi-valued band image area according to the first embodiment.

Of these areas, the RGB multi-valued band image area 13e stores therein band data (ARGB pixel band data) that holds A (attribute) and color values of the color components R, C, and B and is drawn based on the PDL analysis results of, for example, the PDF data. FIG. 3 is a diagram illustrating a format example of the RGB multi-valued band image area 13e according to the first embodiment. As illustrated in FIG. 3, the format of the RGB multi-valued band image area 13e contains A (attribute) and the color components R, G, and B, where the attribute and the pixels of the respective color components are each assigned with 8 bits. Specifically, the ARGB pixel band data is 32-bit multi-valued pixel image data (multi-valued image) in which each of the attribute and pixels of the color components has a bit depth of 8 bits. The value of A corresponds to a pixel attribute plane that is created to hold an attribute value (attribute value of pixels) representing, as an attribute of the pixels, a value for associating a drawing object. The value of A is created because, if drawing data representing the drawing objects, such as a character, a graphic, and an image, is lost when the pixel data is drawn, the characteristics of each drawing object are difficult to be reflected to the image data to be output.

Figure 4:
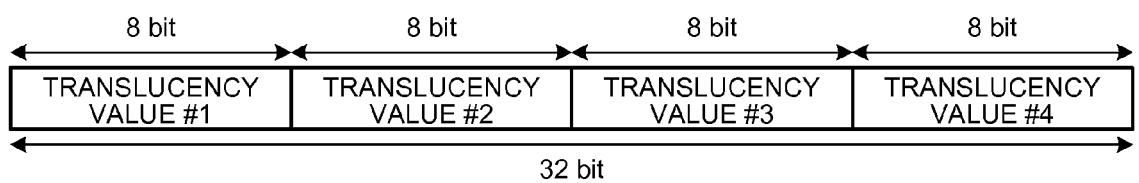
FIG. 4 is a diagram illustrating a format example of a translucent band image area according to the first embodiment.

The translucent band image area 13f stores therein band data (translucent plane band data) of a translucent plane (destination transmission plane) that holds a translucency value used for the translucency processing and is drawn based on the PDL analysis results of, for example, the PDF data. FIG. 4 is a diagram illustrating a format example of the translucent band image area 13f according to the first embodiment. As illustrated in FIG. 4, the format of the translucent band image area 13f contains translucency values (parameters of the translucency processing) #1 to #4 corresponding to A (attribute) and the pixels of the color components R, G, and B, where the translucency values of the pixels of the respective planes are each assigned with 8 bits. Specifically, the translucent plane band data is 32-bit translucent plane image data (translucent image) in which each of the translucency values of the pixels of the respective planes has a bit depth of 8 bits.

Figure 5:
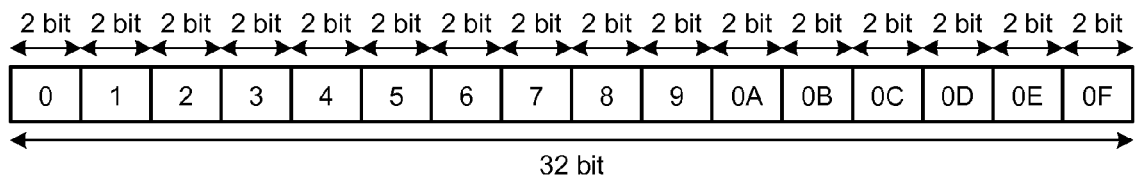
FIG. 5 is a diagram illustrating a format example of a less-than-multi-valued band image area according to the first embodiment.

The less-than-multi-valued band image areas for the C, M, Y, and K plates store therein the C, M, Y, and K less-than-multi-valued band images, respectively. FIG. 5 is a diagram illustrating a format example of each of the less-than-multi-valued band image areas according to the first embodiment. As illustrated in FIG. 5, in the format of each of the less-than-multi-valued band image areas for the C, M, Y, and K plates, each of the pixels of the planes is assigned with 2 bits. Specifically, the less-than-multi-valued band image data is 32-bit less-than-multi-valued plane image data (less-than-multi-valued image) in which each of the pixels of the planes has a bit depth of 2 bits.

The drawing control unit 200 includes a bus interface 210, a direct memory access (DMA) processing unit 220, a less-than-multi-valued drawing unit 230, a multi-valued drawing unit 240, a value-count reducing image processing unit 250, a less-than-multi-valued encoding processing unit 260, a memory control unit 270, a less-than-multi-valued decoding processing unit 280, and an engine controller 290. The drawing control unit 200 reads the drawing commands and other data stored in the main memory 12 via the bus 14, and transfers them to the image memory 13. The drawing control unit 200 reads the drawing commands from the image memory 13, then analyzes the drawing commands, and executes a drawing process into the band image areas of the image memory 13. The drawing control unit 200 controls the printer engine 3 to print the drawn image.

The bus interface 210 is an interface to the bus 14. The DMA processing unit 220 reads the drawing commands from the drawing command area 12a of the main memory 12, and stores them in the drawing command area 13k included in the image memory 13. The less-than-multi-valued drawing unit 230 reads the drawing commands stored in the drawing command area 13k, and executes the drawing process into each of the less-than-multi-valued band image areas (the C-plate, the M-plate, the Y-plate, and K-plate less-than-multi-valued band image areas 13g, 13h, 13i, and 13j) of the image memory 13. The less-than-multi-valued drawing process by the less-than-multi-valued drawing unit 230 is triggered when the CPU 110 determines to execute the less-than-multi-valued drawing process in the determination of which of the multi-valued drawing and the less-than-multi-valued drawing is to be executed. For example, the less-than-multi-valued drawing unit 230 executes the less-than-multi-valued drawing process if the CPU 110 determines that the PDF data does not include the translucency command (translucent drawing). The less-than-multi-valued drawing process rarely uses a large amount of memory. For this reason, the less-than-multi-valued drawing process may draw the less-than-multi-valued image for each page image representing one page of the image data, or may draw the less-than-multi-valued image for each band image.

The multi-valued drawing unit 240 reads the drawing commands stored in the drawing command area 13k, and executes the drawing process into each of the multi-valued band image areas (the RGB multi-valued band image area 13e and the translucent band image area 13f) of the image memory 13. The multi-valued drawing process by the multi-valued drawing unit 240 is triggered when the CPU 110 determines to execute the multi-valued drawing process in the determination of which of the multi-valued drawing and the less-than-multi-valued drawing is to be executed. For example, the multi-valued drawing unit 240 executes the multi-valued drawing process if the CPU 110 determines that the PDF data includes the translucency command (translucent drawing). The multi-valued drawing process often uses a large amount of memory. For this reason, the multi-valued drawing process preferably draws the multi-valued image on a band-image by band-image basis.

The value-count reducing image processing unit 250 reads the multi-valued band image from the multi-valued band image area of the image memory 13, then executes image processing, and transfers the result to the less-than-multi-valued band image areas of the image memory 13. The image processing executed by the value-count reducing image processing unit 250 is, for example, the color conversion process, the gradation process, and the conversion process of converting the image data after being gradation-processed pixel by pixel into the planes. In order to apply an encoding process to be described later in the less-than-multi-valued encoding processing unit 260, the value-count reducing image processing unit 250 executes such image processing after the multi-valued drawing unit 240 has executed the multi-valued drawing process. In other words, the present embodiment uses the less-than-multi-valued encoding processing unit 260 in common after the drawing process is executed by the less-than-multi-valued drawing unit 230 or the multi-valued drawing unit 240 depending on the determination by the CPU 110 as to which of the multi-valued drawing and the less-than-multi-valued drawing is to be executed. This is the purpose for which the value-count reducing image processing unit 250 executes the value-count reducing image processing after the multi-valued drawing unit 240 has executed the multi-valued drawing process. Details of the processing by the value-count reducing image processing unit 250 will be described later.

The less-than-multi-valued encoding processing unit 260 reads the less-than-multi-valued band image from the less-than-multi-valued band image areas of the image memory 13, then encodes the less-than-multi-valued band image, and transfers the result to the less-than-multi-valued page code areas (the C-plate, the M-plate, the Y-plate, and K-plate less-than-multi-valued page code areas 13*a*, 13*b*, 13*c*, and 13*d*) of the image memory 13. The less-than-multi-valued encoding processing uses a method that can compress less-than-multi-valued images, such as Joint Bi-level Image Experts Group (JBIG) images. As described above, the less-than-multi-valued encoding processing unit 260 is used in common after the less-than-multi-valued drawing is executed and after the number of values of the multi-valued drawn image is reduced.

The less-than-multi-valued decoding processing unit 280 reads the less-than-multi-valued encoded image from the less-than-multi-valued page code areas of the image memory 13, then decodes the less-than-multi-valued encoded image, and transfers the result to the engine controller 290. The less-than-multi-valued decoding processing uses a method that can decode less-than-multi-valued images, such as JBIG images. Each of the above-described processes that use the image memory 13 is executed via the memory control unit 270. Specifically, the memory control unit 270 controls the memory access to the image memory 13 according to a memory access request from each of the DMA processing unit 220, the less-than-multi-valued drawing unit 230, the multi-valued drawing unit 240, the value-count reducing image processing unit 250, the less-than-multi-valued encoding processing unit 260, and the less-than-multi-valued decoding processing unit 280. The engine controller 290 controls the printer engine 3 to print the decoded image.

Details of Less-than-Multi-Valued Drawing Unit

Figure 6:
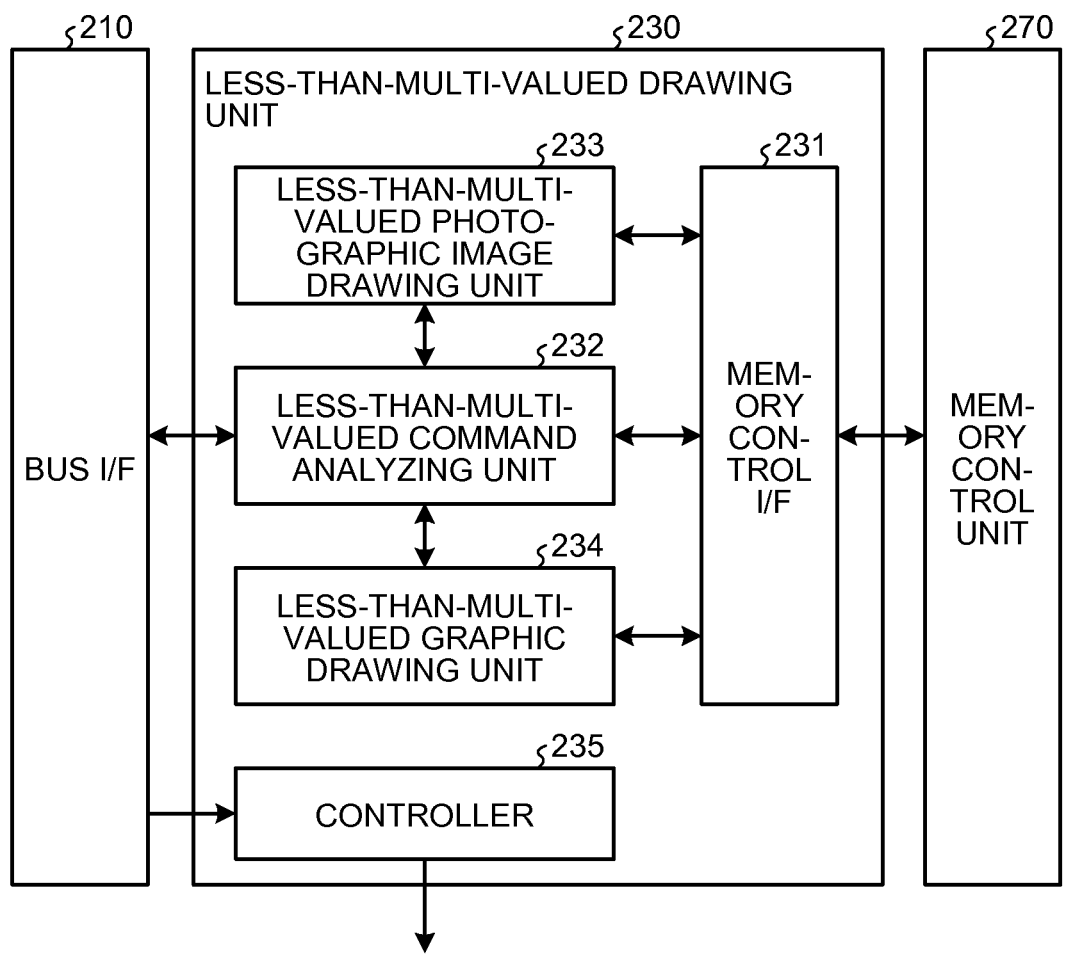
FIG. 6 is a diagram illustrating a detailed configuration example of a less-than-multi-valued drawing unit according to the first embodiment.

The detailed configuration of the less-than-multi-valued drawing unit 230 according to the first embodiment will be described using FIG. 6. FIG. 6 is a diagram illustrating an example of the detailed configuration of the less-than-multi-valued drawing unit 230 according to the first embodiment.

As illustrated in FIG. 6, the less-than-multi-valued drawing unit 230 includes a memory control interface 231, a less-than-multi-valued command analyzing unit 232, a less-than-multi-valued photographic image drawing unit 233, a less-than-multi-valued graphic drawing unit 234, and a controller 235.

The memory control interface 231 is an interface with the memory control unit 270. The less-than-multi-valued drawing unit 230 exchanges various types of information with the memory control unit 270 via the memory control interface 231. The less-than-multi-valued command analyzing unit 232 sequentially reads less-than-multi-valued drawing commands from the drawing command area 13*k* of the image memory 13, and transfers drawing parameters to the less-than-multi-valued photographic image drawing unit 233 and/or the less-than-multi-valued graphic drawing unit 234.

For example, if a less-than-multi-valued drawing command is a drawing hardware parameter setting command, the less-than-multi-valued command analyzing unit 232 transfers parameters to the less-than-multi-valued photographic image drawing unit 233 and the less-than-multi-valued graphic drawing unit 234, and reads the next command. If, for example, the less-than-multi-valued drawing command is a graphic drawing command, the less-than-multi-valued command analyzing unit 232 transfers drawing parameters to the less-than-multi-valued graphic drawing unit 234, and further transfers thereto a start signal for the graphic drawing. Then, if an end signal is received from the less-than-multi-valued graphic drawing unit 234, the less-than-multi-valued command analyzing unit 232 reads the next command.

If, for example, the less-than-multi-valued drawing command is a photographic image drawing command, the less-than-multi-valued command analyzing unit 232 transfers drawing parameters to the less-than-multi-valued photographic image drawing unit 233, and further transfers thereto a start signal for the photographic image drawing. Then, if an end signal is received from the less-than-multi-valued photographic image drawing unit 233, the less-than-multi-valued command analyzing unit 232 reads the next command.

The less-than-multi-valued photographic image drawing unit 233 receives the drawing parameters from the less-than-multi-valued command analyzing unit 232, and executes the photographic image drawing process based on the start signal. After the photographic image drawing process ends, the less-than-multi-valued photographic image drawing unit 233 sends the end signal to the less-than-multi-valued command analyzing unit 232. The less-than-multi-valued graphic drawing unit 234 receives the drawing parameters from the less-than-multi-valued command analyzing unit 232, and executes the graphic drawing process based on the start signal. After the graphic drawing process ends, the less-than-multi-valued graphic drawing unit 234 sends the end signal to the less-than-multi-valued command analyzing unit 232. The controller 235 controls the entire less-than-multi-valued drawing unit 230.

Details of Multi-Valued Drawing Unit

Figure 7:
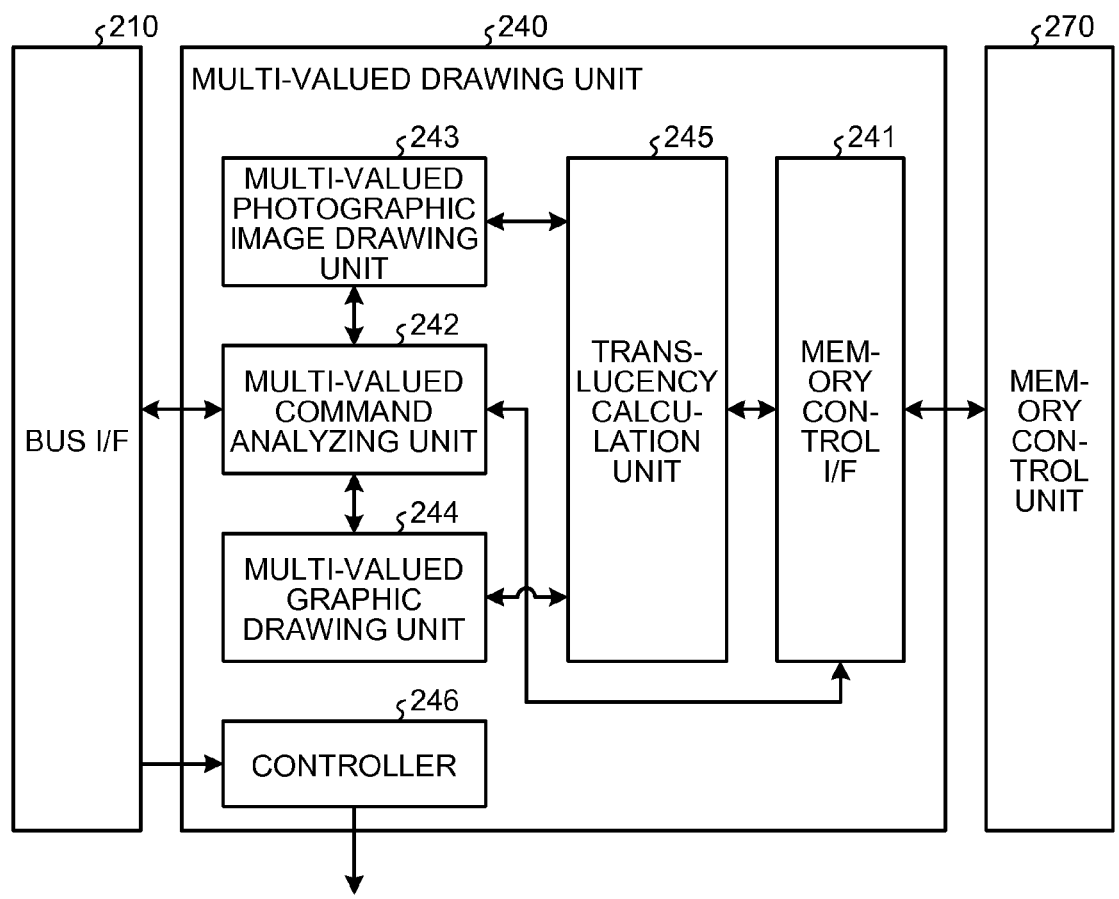
FIG. 7 is a diagram illustrating a detailed configuration example of a multi-valued drawing unit according to the first embodiment.

The detailed configuration of the multi-valued drawing unit 240 according to the first embodiment will be described using FIG. 7. FIG. 7 is a diagram illustrating an example of the detailed configuration of the multi-valued drawing unit 240 according to the first embodiment.

As illustrated in FIG. 7, the multi-valued drawing unit 240 includes a memory control interface 241, a multi-valued command analyzing unit 242, a multi-valued photographic image drawing unit 243, a multi-valued graphic drawing unit 244, a translucency calculation unit 245, and a controller 246.

The memory control interface 241 is an interface with the memory control unit 270. The multi-valued drawing unit 240 exchanges various types of information with the memory control unit 270 via the memory control interface 241. The multi-valued command analyzing unit 242 sequentially reads multi-valued drawing commands from the drawing command area 13*k* of the image memory 13, and transfers drawing parameters to the multi-valued photographic image drawing unit 243 and/or the multi-valued graphic drawing unit 244.

For example, if a multi-valued drawing command is a drawing hardware parameter setting command, the multi-valued command analyzing unit 242 transfers parameters to the multi-valued photographic image drawing unit 243 and the multi-valued graphic drawing unit 244, and reads the next command. If, for example, the multi-valued drawing command is a graphic drawing command, the multi-valued command analyzing unit 242 transfers drawing parameters to the multi-valued graphic drawing unit 244, and further transfers thereto a start signal for the graphic drawing. Then, if an end signal is received from the multi-valued graphic drawing unit 244, the multi-valued command analyzing unit 242 reads the next command.

If, for example, the multi-valued drawing command is a photographic image drawing command, the multi-valued command analyzing unit 242 transfers drawing parameters to the multi-valued photographic image drawing unit 243, and further transfers thereto a start signal for the photographic image drawing. Then, if an end signal is received from the multi-valued photographic image drawing unit 243, the multi-valued command analyzing unit 242 reads the next command.

The multi-valued photographic image drawing unit 243 receives the drawing parameters from the multi-valued command analyzing unit 242, and executes the photographic image drawing process based on the start signal. After the photographic image drawing process ends, the multi-valued photographic image drawing unit 243 sends the end signal to the multi-valued command analyzing unit 242. The multi-valued graphic drawing unit 244 receives the drawing parameters from the multi-valued command analyzing unit 242, and executes the graphic drawing process based on the start signal. After the graphic drawing process ends, the multi-valued graphic drawing unit 244 sends the end signal to the multi-valued command analyzing unit 242. The controller 246 controls the entire multi-valued drawing unit 240.

The translucency calculation unit 245 executes the translucency processing. More specifically, the translucency calculation unit 245 accepts drawing data and addresses thereof from the multi-valued photographic image drawing unit 243 or the multi-valued graphic drawing unit 244; then, the translucency calculation unit 245 acquires the color values and the translucency values of the multi-valued band image from the image memory 13 (RGB multi-valued band image area 13e) indicated by the addresses of the data to be drawn, and, after performing a translucency calculation, draws the multi-valued band image with the color values and the translucency values into the image memory 13 (translucent band image area 13f).

Details of Value-Count Reducing Image Processing Unit

Figure 8:
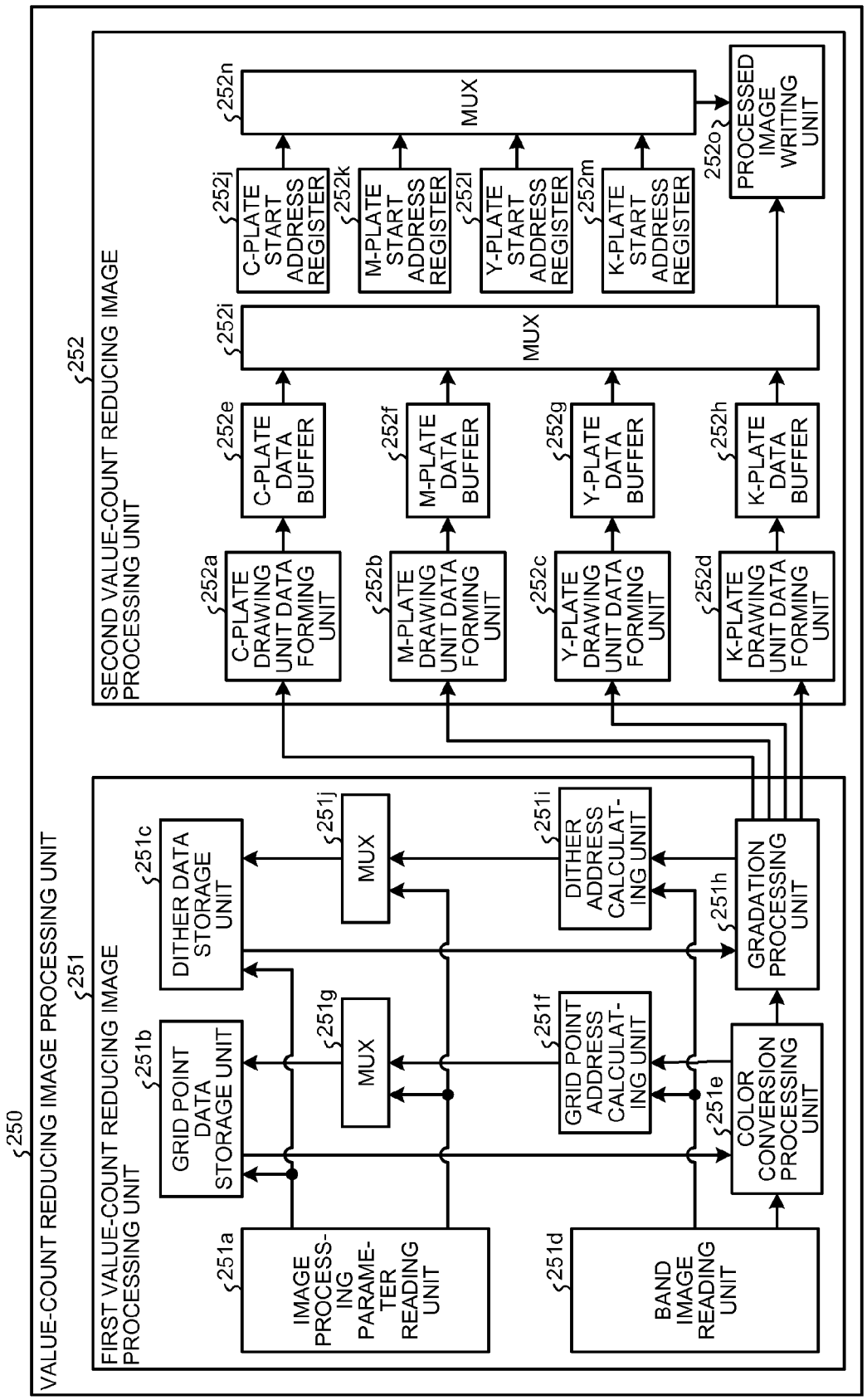
FIG. 8 is a diagram illustrating a detailed configuration example of a value-count reducing image processing unit according to the first embodiment.

The detailed configuration of the value-count reducing image processing unit 250 according to the first embodiment will be described using FIG. 8. FIG. 8 is a diagram illustrating an example of the detailed configuration of the value-count reducing image processing unit 250 according to the first embodiment.

As illustrated in FIG. 8, the value-count reducing image processing unit 250 includes a first value-count reducing image processing unit 251 and a second value-count reducing image processing unit 252. Of these units, the first value-count reducing image processing unit 251 executes, for example, the color conversion process and the gradation process, and the second value-count reducing image processing unit 252 executes, for example, the conversion process of converting the image data after being gradation-processed pixel by pixel into the planes.

The first value-count reducing image processing unit 251 includes an image processing parameter reading unit 251a, a grid point data storage unit 251b, a dither data storage unit 251c, and a band image reading unit 251d. In addition, the first value-count reducing image processing unit 251 includes a color conversion processing unit 251e, a grid point address calculating unit 251f, a multiplexer (mux) 251g, a gradation processing unit 251h, a dither address calculating unit 251i, and a mux 251j.

The image processing parameter reading unit 251a accesses the image processing parameter area 12c to acquire image processing parameters, and stores the acquired image processing parameters in the grid point data storage unit 251b and the dither data storage unit 251c. The band image reading unit 251d reads the multi-valued band image from the multi-valued band image area of the image memory 13, and transfers the multi-valued band image to the color conversion processing unit 251e.

The color conversion processing unit 251e reads color conversion grid point data from the grid point data storage unit 251b, then converts RGB colors into CMYK colors, and transfers the results to the gradation processing unit 251h. The grid point address calculating unit 251f generates addresses of the grid point data storage unit 251b based on addresses and attribute values received from the color conversion processing unit 251e. The mux 251g switches between the addresses generated by the grid point address calculating unit 251f and addresses of the image processing parameter reading unit 251a, and transfers the results to the grid point data storage unit 251b.

The gradation processing unit 251h reads dither data from the dither data storage unit 251c, then executes the gradation process, and transfers the results to the second value-count reducing image processing unit 252. The dither address calculating unit 251i generates addresses of the dither data storage unit 251c based on addresses and attribute values received from the gradation processing unit 251h. The mux 251j switches between the addresses generated by the dither address calculating unit 251i and addresses of the image processing parameter reading unit 251a, and transfers the results to the dither data storage unit 251c.

The second value-count reducing image processing unit 252 includes a C-plate drawing unit data forming unit 252a, an M-plate drawing unit data forming unit 252b, a Y-plate drawing unit data forming unit 252c, and a K-plate drawing unit data forming unit 252d. In addition, the second value-count reducing image processing unit 252 includes a C-plate data buffer 252e, an M-plate data buffer 252f, a Y-plate data buffer 252g, a K-plate data buffer 252h, and a mux 252i. The second value-count reducing image processing unit 252 further includes a C-plate start address register 252j, an M-plate start address register 252k, a Y-plate start address register 252l, a K-plate start address register 252m, a mux 252n, and a processed image writing unit 252o.

The C-plate, the M-plate, the Y-plate, and the K-plate drawing unit data forming units 252a, 252b, 252c, and 252d perform, after the gradation processing, processing of grouping pixels of the C-plate, the M-plate, the Y-plate, and the K-plate, respectively, on a word-by-word basis. The C-plate, the M-plate, the Y-plate, and the K-plate data buffers 252e, 252f, 252g, and 252h are buffers for temporarily storing the images of the respective plates grouped on a word-by-word basis. The mux 252i switches between buffer outputs of the respective plates.

The C-plate, the M-plate, the Y-plate, and the K-plate start address registers 252j, 252k, 252l, and 252m hold start addresses of the respective plates. The mux 252n switches between the start address registers of the respective plates, and transfers each of the start addresses to the processed image writing unit 252o. The processed image writing unit 252o accepts the data of the respective plates output by the mux 252i, and transfers the data to the less-than-multi-valued band image areas corresponding to the respective plates of the image memory 13 based on the start addresses transferred by the mux 252n.

Overall Processing Flow

The overall processing flow according to the first embodiment will be described using FIG. 9. FIG. 9 is a flowchart illustrating the overall processing flow according to the first embodiment.

As illustrated in FIG. 9, the communication controller 170 accepts the image data, such as the PDF data, from the PC 2 (Step S101). The accepted PDF data is stored in the PDF area 12b. On a page-by-page basis or a band-image by band-image basis of the PDF data stored in the PDF area 12b, the CPU 110 determines whether a translucency command is included (Step S102).

If so (Yes at Step S102), the CPU 110 generates a multi-valued drawing command for the band image including the translucency command (Step S103). The generated multi-valued drawing command is transferred to the drawing command area 13k. The multi-valued drawing unit 240 reads the multi-valued drawing command from the drawing command area 13k, and draws the image into the multi-valued band image area of the image memory 13 (Step S104). The value-count reducing image processing unit 250 subsequently reads the multi-valued image data from the multi-valued band image area of the image memory 13, and executes the color conversion process, the gradation process, and the conversion process of converting the image data after being gradation-processed pixel by pixel into the planes (Step S105). The data subjected to the value-count reducing image processing is transferred to the less-than-multi-valued band image areas of the image memory 13.

The less-than-multi-valued encoding processing unit 260 thereafter reads the less-than-multi-valued image data from the less-than-multi-valued band image areas of the image memory 13, and encodes the less-than-multi-valued image data (Step S106). The encoded data is transferred to the less-than-multi-valued page code areas of the image memory 13. The less-than-multi-valued decoding processing unit 280 reads the less-than-multi-valued encoded image from the less-than-multi-valued page code areas of the image memory 13, and decodes the less-than-multi-valued encoded image (Step S107). The decoded data is transferred to the engine controller 290, and printed by the printer engine 3.

If no translucency command is determined to be included (No at Step S102), the CPU 110 generates a less-than-multi-valued drawing command for the band image or page image including no translucency command (Step S108). The generated less-than-multi-valued drawing command is transferred to the drawing command area 13k. The less-than-multi-valued drawing unit 230 reads the less-than-multi-valued drawing command from the drawing command area 13k, and draws the image into the less-than-multi-valued band image areas of the image memory 13 (Step S109). After these processes, the less-than-multi-valued encoding processing unit 260 executes the less-than-multi-valued encoding processing (Step S106), and the less-than-multi-valued decoding processing unit 280 executes the less-than-multi-valued decoding processing (Step S107). The decoded data is transferred to the engine controller 290, and printed by the printer engine 3.

Advantageous Effects by First Embodiment For data, such as the PDF data, the image forming apparatus 1 determines, on a page-by-page basis or a band-image by band-image basis, whether a translucency command is included, thereby determining which of the multi-valued drawing and the less-than-multi-valued drawing is to be executed, and executes the less-than-multi-valued drawing process or the multi-valued drawing process. After executing the multi-valued drawing process, the image forming apparatus 1 executes the value-count reducing image processing, and applies the less-than-multi-valued decoding processing to the data after being subjected to the value-count reducing image processing. The hardware used in the less-than-multi-valued decoding processing is also used in common in the less-than-multi-valued decoding processing applied to the data after being subjected to the less-than-multi-valued drawing process. As a result of these configurations, the image forming apparatus 1 can simplify the configuration of the hardware used for the image processing.

In general, band images including translucent images are considered to be fewer than band images including no translucent images. As a result, the image processing flow mainly uses the less-than-multi-valued drawing unit 230, the less-than-multi-valued encoding processing unit 260, and the less-than-multi-valued decoding processing unit 280 that serve as functions for the less-than-multi-valued drawing. In the present embodiment, the multi-valued drawing unit 240 serving as a function for the multi-valued drawing processes the image data, and then the value-count reducing image processing unit 250 reduces the number of values of the image data so as to use the functions for the less-than-multi-valued drawing in common. As a result of these configurations, the image forming apparatus 1 can simplify the configuration of the hardware used for the image processing.

Second Embodiment

While the embodiment of the image forming apparatus 1 according to the present invention has been described above, the present invention may be embodied in various different forms other than the embodiment described above. A different embodiment will be described in terms of (1) configurations and (2) computer programs.

(1) Configurations

The information, including the processing procedures, the control procedures, the specific names, the various types of data, and the parameters, disclosed in the document and the drawings given above can be altered in any desired manner unless otherwise specified. The illustrated components of the devices are functionally conceptual, and need not be physically configured as illustrated. In other words, the specific modes of distribution and integration of the devices are not limited to those illustrated, and all or a part thereof can be functionally or physically distributed or integrated in any desired units according to various kinds of load and conditions of use. For example, the value-count reducing image processing unit 250 may be divided into a "color conversion processing unit" that executes the color conversion process, a "gradation processing unit" that executes the gradation process, and a "plane conversion processing unit" that executes the conversion process of converting the image data pixel by pixel into the planes.

(2) Computer Programs

The computer programs executed in the image forming apparatus 1 are provided, as one mode, by being recorded as files in an installable format or an executable format in a computer-readable recording medium, such as a CD-ROM, a flexible disk (FD), a CD-R, or a digital versatile disc (DVD). The computer programs executed in the image forming apparatus 1 may also be provided by being stored on a computer connected to a network such as the Internet, and downloaded via the network. The computer programs executed in the image forming apparatus 1 may also be configured to be provided or delivered via a network such as the Internet. The computer programs executed in the image forming apparatus 1 may also be configured to be provided by being preinstalled in a ROM or the like.

The computer programs executed in the image forming apparatus 1 are composed of modules for executing processing using the above-described units (such as the CPU 110, the less-than-multi-valued drawing unit 230, the multi-valued drawing unit 240, the value-count reducing image processing unit 250, the less-than-multi-valued encoding processing unit 260, and the less-than-multi-valued decoding processing unit 280). As actual hardware, a processor (CPU) reads the computer programs from a storage medium and executes them so that the functions for executing the processing using the above-described units are loaded and generated in the main memory.

One aspect of the present invention provides the effect of simplifying the configuration of the hardware used for image processing.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
   a determining unit that determines whether image data includes multi-valued drawing information for drawing a multi-valued image;
   a multi-valued drawing unit that draws the multi-valued image of the image data when the multi-valued drawing information is determined to be included in the image data;
   a less-than-multi-valued drawing unit that draws a less-than-multi-valued image of the image data when the multi-valued drawing information is not determined to be included in the image data;
   a value-count reducing image processing unit that reduces number of values of a drawing result of the multi-valued image to generate an image with a fewer number of values; and
   a less-than-multi-valued encoding processing unit that encodes a drawing result obtained by drawing the less-than-multi-valued image and encodes the generated image with the fewer number of values.

2. The image processing apparatus according to claim 1, wherein
   the determining unit determines whether the image data includes a translucency command that represents that a translucent image is included in the image data,
   the multi-valued drawing unit draws the multi-valued image of the image data when the translucency command is determined to be included in the image data, and
   the less-than-multi-valued drawing unit draws the less-than-multi-valued image of the image data when the translucency command is not determined to be included in the image data.

3. The image processing apparatus according to claim 1, wherein
   the determining unit determines, on a page-by-page basis of the image data, whether the multi-valued drawing information is included in the image data,
   the multi-valued drawing unit draws the multi-valued image for each band image obtained by dividing one page of the image data, and
   the less-than-multi-valued drawing unit draws the less-than-multi-valued image for each page image representing one page of the image data.

4. The image processing apparatus according to claim 1, wherein
   the determining unit determines whether the multi-valued drawing information is included in the image data for each band image obtained by dividing one page of the image data, or on a page-by-page basis of the image data,
   the multi-valued drawing unit draws the multi-valued image for each band image, or for each page image representing one page of the image data, and
   the less-than-multi-valued drawing unit draws the less-than-multi-valued image for each band image, or for each page image.

5. The image processing apparatus according to claim 1, wherein the value-count reducing image processing unit generates the image with the fewer number of values by applying a color conversion process and a gradation process to the drawing result of the multi-valued image, and executing a conversion process of converting the image data after being gradation-processed pixel by pixel into planes.

6. The image processing apparatus according to claim 1, wherein
   the less-than-multi-valued drawing unit stores the less-than-multi-valued image of the image data in a memory,
   the value-count reducing image processing unit stores the image with the fewer number of values in the memory, and
   the less-than-multi-valued encoding processing unit encodes the less-than-multi-valued image stored in the memory and the image with the fewer number of values stored in the memory.

7. An image processing method comprising:
   determining whether image data includes multi-valued drawing information for drawing a multi-valued image;
   drawing the multi-valued image of the image data when the multi-valued drawing information is determined to be included in the image data;
   drawing a less-than-multi-valued image of the image data when the multi-valued drawing information is not determined to be included in the image data;
   reducing number of values of a drawing result of the multi-valued image to generate an image with a fewer number of values; and
   encoding a drawing result obtained by drawing the less-than-multi-valued image and encoding the generated image with the fewer number of values.

8. An image forming apparatus comprising:
   a determining unit that determines whether image data includes multi-valued drawing information for drawing a multi-valued image;
   a multi-valued drawing unit that draws the multi-valued image of the image data when the multi-valued drawing information is determined to be included in the image data;
   a less-than-multi-valued drawing unit that draws a less-than-multi-valued image of the image data when the multi-valued drawing information is not determined to be included in the image data;
   a value-count reducing image processing unit that reduces number of values of a drawing result of the multi-valued image to generate an image with a fewer number of values; and
   a less-than-multi-valued encoding processing unit that encodes a drawing result obtained by drawing the less-than-multi-valued image and encodes the generated image with the fewer number of values.

* * * * *